Oct. 28, 1969        W. L. WILSON ET AL        3,475,123
METHOD OF PREPARING METAL OXIDES
Filed Feb. 24, 1967                                        2 Sheets-Sheet 2

INVENTORS
WILLIAM L. WILSON and
FRANKLIN STRAIN
HOWARD H. HOEKJE

ATTORNEYS

United States Patent Office 3,475,123
Patented Oct. 28, 1969

3,475,123
METHOD OF PREPARING METAL OXIDES
William L. Wilson and Franklin Strain, Barberton, and Howard H. Hoekje, Akron, Ohio, assignors to PPG Industries, Inc., Pittsburgh, Pa., a corporation of Pennsylvania
Continuation-in-part of applications Ser. No. 354,597, Mar. 25, 1964, and Ser. No. 446,313, Apr. 7, 1965. This application Feb. 24, 1967, Ser. No. 618,538
Int. Cl. C01g 23/06; C09c 1/36
U.S. Cl. 23—202
20 Claims

ABSTRACT OF THE DISCLOSURE

Metal oxides, such as titanium dioxide, are prepared by vapor phase oxidation of corresponding metal halides in a reaction space supplied with heat energy from a gaseous stream heated by electrical energy. Electrically generated gaseous plasmas, such as arc plasmas, are described.

CROSS-REFERENCE TO RELATED APPLICATIONS

This application is a continuation-in-part application of application Ser. No. 354,597, filed Mar. 25, 1964, and application Ser. No. 446,313, filed Apr. 7, 1965.

BACKGROUND OF THE INVENTION

In the production of metal oxides by vapor phase oxidation of one or more metal halides, either in the presence or absence of a fluid bed, metal halide is oxidized by reaction, in the vapor phase, with an oxygenating gas, such as oxygen, free oxygen-containing gas, e.g., air and oxygen-enriched air, or an oxidizing gas, such as oxides of nitrogen, phosphorus, and hydrogen peroxide, in a reaction zone maintained at temperatures at which the metal halide and oxygen react. Where the reactants are, for example, titanium tetrachloride and oxygen, the temperature of the reaction is above 500° C., and typically is between about 900° C. and about 1,500° C.

Although the reaction of metal halides with oxygen in the vapor phase is typically exothermic, it has been found in some cases that the heat of reaction is insufficient to preheat newly introduced reactants from normal ambient temperatures to reaction temperature and to thus maintain the reaction on a continuous basis. The lack of efficient use of the heat of reaction has been attributed, in large part, to the removal of large quantities of usable heat by the metal oxide effluent product stream. Additional usable heat is lost by virtue of intensive radiation by the highly-heated metal oxide product particles and by heat losses through the reactor walls. Consequently, it has been found necessary to continuously supply heat to the reaction zone in order to maintain the oxidation reaction on a continuous scale.

Supplying heat to a metal halide vapor phase oxidation reaction zone, such as in the production of titanium dioxide, has been found to be difficult due to the character of the reaction. Some of the problems associated with the reaction include handling highly heated corrosive reactants, accomplishing rapid mixing of the reactants, and maintaining the absence of substantial metal oxide growth on the surfaces of the equipment. It has been suggested to provide heat to such reaction zone by heating the reaction chamber from the outside. However, due to inefficient heat transfer coefficients of materials required to withstand both high reaction temperatures and the corrosive nature of the reaction environment, e.g., ceramics, and owing to reactions on the reactor wall surfaces, which cause encrustation of the walls and inlet tubes with metal oxide, such heating methods have not been totally successful. Another method suggested has ben to feed heated inert gases through the walls of a porous reactor. This method eliminates, in part, the problem of encrustation, but dilutes the product stream and ads additional heating requirements to the over-all process.

Attempts have been made to feed the required amount of heat by separately preheating the reactant gases to or above reaction temperatures before exposing them to the reaction zone. However, highly heated metal halides and oxygen-containing gases are extremely corrosive and attack known metals and alloys to such an extent that only ceramic materials can be used as a material of construction. Moreover, obstruction of feed pipes, nozzles, etc., by metal oxide deposits or growth is an ever present danger in such a process because the reactants at this energy level react immediately upon contact. Although the problem of obstruction has been remedied in part by using complicated burner designs, this solution has not been entirely satisfactory.

Still another proposed heating method consists of admixing oxygen or metal halide with a carbonaceous combustible material, e.g., carbon or carbon monoxide, bringing the admixture into contact with the other reactant and igniting the carbonaceous material. However, it has been found that combustibles containing metal halide are very difficult to ignite because the presence of even small quantities of metal halide raises the ignition temperature of the combustible considerably. Moreover, the flame, once ignited, tends to go out in the presence of liberated halogen, e.g., chlorine. To overcome these difficulties, it was found that large quantities of combustibles, such as carbon monoxide, had to be used to maintain the flame and, as a result, such a process was found to be costly. Moreover, feeding combustion gases separately to the reaction zone was found to dilute the product stream to such a point that metal oxide and evolved halogen recovery costs became an added consequence bearing on the over-all economics of the process.

SUMMARY OF THE INVENTION

This invention relates to the production of metal oxides, notably finely-divided metal oxides, and in particular relates to the production of white, pigmentary metal oxides by vapor phase oxidation of the corresponding metal halides with oxygenating gas at elevated temperatures. More particularly, this invention relates to vapor phase oxidation processes wherein heat supplied for such reaction is provided, in part, by converting electrical energy into heat energy. Still more particularly, this invention relates to the use of a heated gaseous stream, e.g., an arc plasma, heated by a discharge of electrical energy, e.g., an electric arc conducted between silver-copper alloy electrodes, to furnish heat the reaction zone.

DETAILED DESCRIPTION

Figure 1:
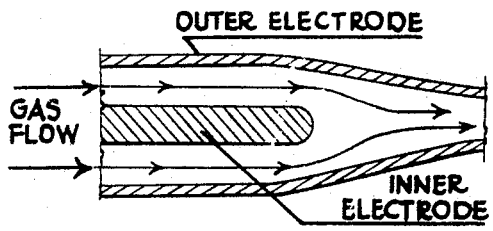
FIGURE 1 is a cross-sectional view of a cylindrical coaxial electrode configuration consisting of an inner electrode and a concentric outer electrode.

It is now proposed, in accordance with the present invention, to utilize a hot gas, e.g., plasma, deriving its heat from the conversion of electrical energy into heat energy for supplying heat to a metal halide vapor phase oxidation reaction space. One method for accomplishing the conversion of electrical energy into heat energy is to pass a gas through an electric arc conducted between electrodes. However, when corrosive gases are heated by this method, it has been found further that the useful life of conventional electrodes, e.g., copper, is relatively short and contamination of the product with eroded electrode material can result. For example, the use of a corrosive gas, such as oxygen, air, CO, $CO_2$, etc., can cause rapid deterioration of the electrode and undue contamination of the metal oxide product. Contamination of the metal oxide product with eroded electrode material can result in the production of less desirable pigment, e.g., discolored pigment. Frequent shutdowns to replace electrodes is detrimental to the production of metal oxides of consistent quality and, therefore, to the economics of the process. Moreover, frequent replacement of electrodes is costly in both material and production costs.

The absence of the aforementioned factors are especially important in the production of white pigmentary metal oxides, such as titanium dioxide. To prolong the useful life and reduce deterioration of conventional electrodes, e.g., copper, tungsten, thoriated tungsten, carbon, etc., it has been customary to use inert gases, i.e., non-corrosive and non-reactive, with respect to the electrode, as a shield gas or as the gas which is to be heated. Typical of such inert gases include nitrogen, argon, helium, etc. The use of these inert gases, however, serves to unnecessarily dilute the reactor effluent stream which, like the use of combustion gases, introduces extensive and costly recovering schemes into the process.

It has now also been discovered that vapor phase oxidation of metal halides can be sustained over extended periods without frequent shutdown and objectionable contamination of the metal oxide product by using a highly heated gaseous stream which has been heated by passage through a discharge of electrical energy conducted between silver-copper alloy electrodes. Typically, the discharge of electrical energy, e.g., an electric arc discharge, is sufficiently intense to produce a gaseous plasma. Silver-copper alloy electrodes have been found to be more resistant to deterioration, even in the presence of corrosive or oxidative gases, e.g., oxygen, than the conventional type electrodes recited hereinabove and thus provide extended periods of continuous operation, e.g., as long as seven weeks, with no objectionable contamination. As used herein, the term "silver-copper alloy" is intended to mean and include alloys containing silver and copper and silver, copper and minor amounts of one or more other metals, i.e., binary, ternary, quaternary, etc., metal alloys.

In accordance with the present invention, heat is furnished to a metal halide vapor phase oxidation reaction zone by a highly heated gas that has been heated by passage through a discharge of electrical energy, e.g., an electric arc, conducted between electrodes. The gas heated with electrical energy will be referred to hereinafter for simplicity as the "arc gas." The arc gas can be heated to various temperatures since its temperature is, in part, a function of the current applied between the electrodes. For example, temperatures ranging from about 1,600° C. to about 30,000° C. can be obtained depending on the physical properties of the gas and the current applied. At high temperatures, e.g., 8,000–9,000° K., a gas appears as a luminous gaseous-like mass due to ionized particles contained therein. Luminosity can also be attributed to the recombination of atoms which can take place at temperatures as low as 3,000° K. Gaseous streams of this appearance are conventionally known as plasmas and when heated with an electric arc are known as arc plasmas. Electric arcs capable of generating plasmas are generally known as plasma arcs.

The increased energy of the arc gas, e.g., plasma, after exposure to the electrical discharge, is distributed into several forms because of the natural tendency of the gas, such as oxygen, to break down reversibly. Thus, a large part of the energy of the electrical discharge is used to excite, dissociate, and ionize the arc gas. Apart from radiation energy, it is energy from these three forms which takes part in energy transfer from the electrical discharge to the gas. These forms of energy are eventually exhibited in the form of thermal energy. Thus, the dissociation and ionization of gaseous molecules require energy which is not immediately reflected as increased temperature of the gas. However, when the gas stream is subsequently cooled and the atoms recombine, this energy is freed and is then reflected in the thermal and kinetic energy of the gas stream.

A plasma usually contains neutral particles, ionized particles, and free electrons, all of which are free to move and have mutual collisions. These atoms, ions, and electrons cause the rapid transfer of the dissociation, ionization, and excitation energies to relatively colder materials admixed with the plasma. In addition, radiaiton from the plasma also plays an important role in heating cooler materials with which it is admixed.

In accordance with the present invention, it has been found further that silver-copper alloy electrodes exhibit significantly better weight loss and durability characteristics than electrodes conventionally used for generating highly heated gaseous streams, e.g., arc plasmas, by electrical discharge means. Such electrodes employed are constructed preferably of a homogeneous alloy of silver and copper comprising at least 72 weight percent silver and at least 1 weight percent copper. In addition, the electrodes are, advantageously, relatively free from voids and slag inclusions. Void, as used herein, is defined as comprising a gas or vacuum bubble, slag inclusion, pinhole, crack, crater, cavity, phase discontinuity, and/or other nonhomogeneity in the electrode material. The electrodes may be fabricated, for example, by extrusion or casting. It has been found that an excellent homogeneous mass substantially free of voids is readily obtained by vacuum casting the electrode and selecting that portion of the billet least likely to contain voids. Mechanical working of the metal, as by extrusion, has also been shown to reduce the residual voids present, if any.

Generally, the electrode should be free of voids greater than 450 microns in width, breadth, depth, axis, or diamter, especially within that portion in direct contact with the electrical discharge. Furthermore, the summation volume of a series of group of smaller voids should be less than the equivalent volume of a single 450 microns size void. More particularly, that portion of the electrode on which the electrical discharge falls should contain less than 0.0001 percent by volume void, preferably not greater than 0.00005 percent.

While it is preferred that the entire electrode be prepared from the silver-copper alloy described herein, it is also contemplated that only that portion or section of the electrode subject to wear by the electrical discharge, e.g., an arc, need be constructed of this material and other conductive materials, such as copper, used to form the remaining structure of the electrode. In this way, two different materials can be used to prepare the electrode.

The silver-copper alloy electrodes employed in the present process advantageously have a sufficiently high melting point, e.g., above 600° C., and a thermal conductivity of at least 0.10 calorie centimeters per second per centimeter squared per degree centigrade (calorie·cm./sec.·cm.² ° C.)

to insure good performance at the high temperatures and high current densities of arc operation. Moreover, the product of the melting point in degrees centigrade and the thermal conductivity in calories centimeter per second per centimeter squared per degree centigrade should yield a numerical product of at least 200, preferably above 300.

As recited hereinabove, the silver-copper alloy electrode preferably comprises at least 72 weight percent silver and at least 1 weight percent copper. The amount of silver in the electrode can range from about 72 to about 99 weight percent and the amount of copper can vary from about 1 to about 28 weight percent. Examples of typical silver-copper alloy compositions include 72 weight per cent silver-28 weight percent copper, 80 weight percent silver-20 weight percent copper, and 90 weight percent silver-10 weight percent copper. Moreover, alloys other than binary alloys are contemplated within the scope of the present invention. For example, alloys comprising 72 to 98 weight percent silver, 1 to 26 weight percent copper, and .01 to 26 weight percent, advantageously 0.1 to 5 weight percent, zirconium, titanium, molybdenum, aluminum, vanadium, thorium, tungsten, or mixtures thereof. Most preferably, the electrode comprises about 80 weight percent silver and about 20 weight percent copper. The amount of silver and copper in this most preferred embodiment typically varies about ±1 weight percent, i.e., from about 79 to 81 weight percent silver, and 19 to 21 weight percent copper, although slightly larger variations are contemplated.

Contamination of metal oxide product by losses from the silver-copper alloy electrodes of the present invention in the presence of corrosive gases has been found to be small in comparison to that from conventional electrodes, e.g., copper and carbon electrodes. Although not desiring to be held to any particular theory, it is believed that a large portion of the eroded silver is redeposited on the electrode due to the instability of silver compounds, such as silver oxide, at the conditions of electrical discharge operation. Moreover, the amount of copper eroded by electrical discharge is proportionately smaller in the electrodes defined herein than would be consumed from an electrode fabricated from substantially all copper. Typically, the amount of consumed copper contaminating the metal oxide product from using the electrodes of the present process is below about 5 p.p.m., and usually is below about 1 to 2 p.p.m. This amount is not objectionable, i.e., does not degrade the color of the metal oxide product, and is below that present in the metal oxide product when, for example, all copper electrodes are used to conduct an electrical discharge.

In addition to less contamination in the metal oxide product, the electrodes of the present process have been found to provide exceptional durability or service characteristics, especially in the presence of corrosive or oxidizing gases. Whereas, conventional electrodes, such as tungsten, thoriated tungsten, carbon, and copper electrodes, deteriorate in relatively short periods, i.e., from a few hours to a week, the electrodes of the present process have been found to be serviceable for periods of from at least two weeks to seven weeks and even longer. This length of service offers much greater continuity and flexibility to the process of the present invention.

Figure 2:
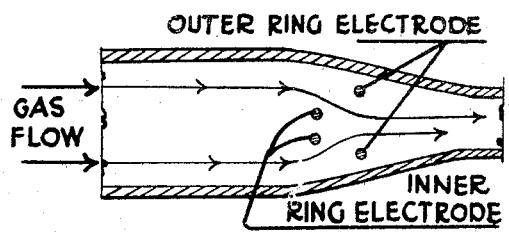
FIGURE 2 is a cross-sectional view of an electrode configuration illustrating two concentric ring electrodes separated by an annular gap, i.e., a toroidal configuration.

Referring now to FIGURES 1 and 2, there is illustrated two electrode configurations between which an electric arc can be generated. Either electrode can serve as the anode or cathode by reversing the polarity of the power source. In the case of alternating current, the polarity reverses automatically. Although both figures show the gas flow chamber as comprising a converging duct to accelerate gas flow, it is possible to employ a gas flow chamber without a converging duct.

Although only four general electrode arrangements are illustrated in FIGURES 1, 2, 3, and 6, it is to be understood that other arrangements are within the skill of the art and within the intended scope of this invention.

Figure 3:
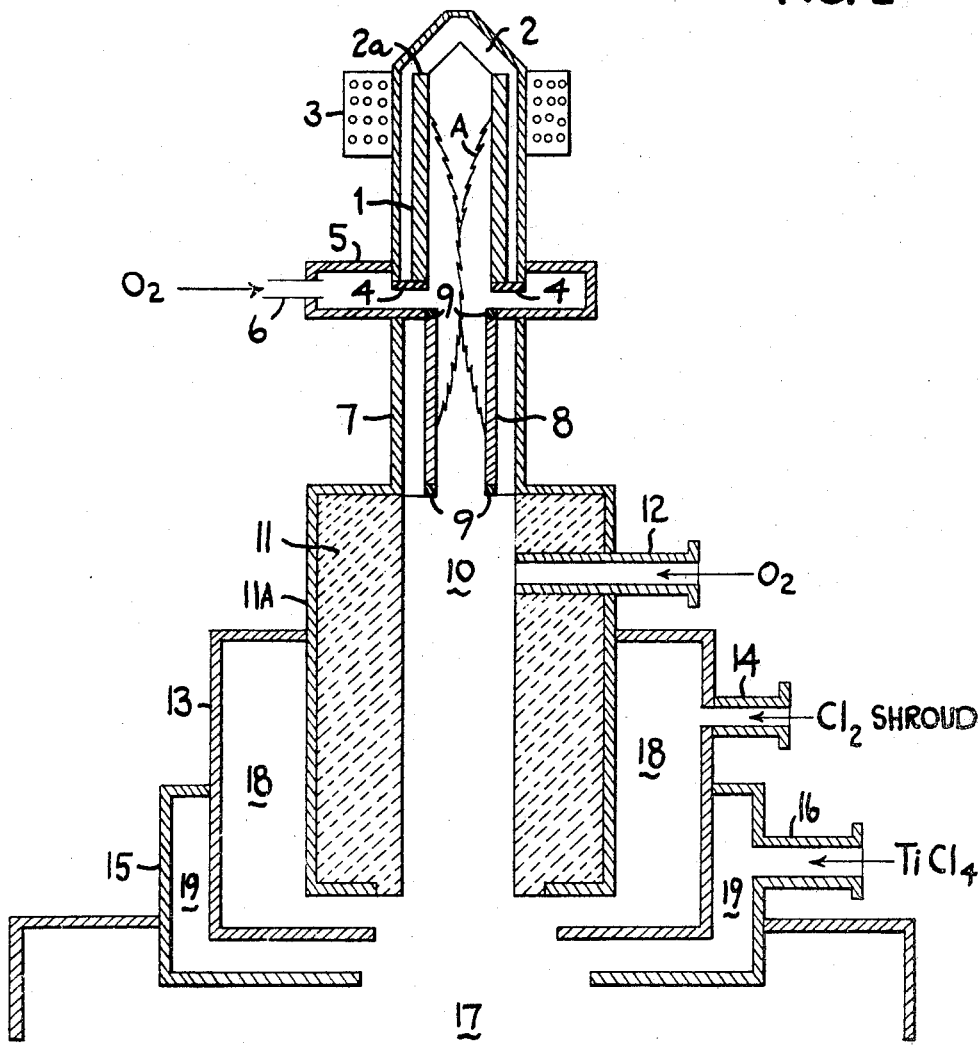
FIGURE 3 is a cross-sectional view of a gaseous plasma generating apparatus mounted atop burner apparatus that is used for mixing vapor phase oxidation reactants, particularly those used in the production of pigmentary titanium dioxide.

The following description of FIGURE 3 is directed, in part, to one particular embodiment of the present invention, i.e., the production of titanium dioxide, in order to give clarity and preciseness to the description. It should be observed, however, that variations in the particular arrangement and nature of the illustrated gaseous streams for producing metal oxides including titanium dioxide are contemplated and are within the scope of the present invention. In addition, although the apparatus in FIGURE 3 is depicted in vertical alignment, other arrangements, such as inclined from the vertical or horizontal alignment are contemplated.

Referring now to FIGURE 3, there is shown an upper or back electrode 1 in the form of a cylinder surrounded by a water-cooling jacket 2 through which water or any suitable cooling medium, e.g., Dowtherm, can be circulated in any conventional manner. Cooling medium inlet and outlet means for cooling jacket 2 are not illustrated. In the vicinity of electrode 1 is produced a magnetic field which serves to extend the life of electrode 1 by keeping the upper termination of the arc moving by means of the rotational vector produced by interaction of the magnetic field with the arc current. Typically, the magnetic field is in a plane transverse to the longitudinal axis of electrode 1. The magnetic field is produced by direct current flowing through a coil 3. This coil typically consists of wire or tubing made of a conductive metal. Since the wire or tubing carries a large current, heat is generated by the resistance of the metal and thus cooling of the coil is usually required. Conventionally, the coil is water-cooled copper tubing. The current and voltage to coil 3 are set at values sufficient to generate a field which will rotate the arc. These variables are not critical to the basic operation of the system and depend on the design of the apparatus.

There is also shown lower electrode 8 in the shape of a cylinder surrounded by cooling jacket 7. Electrode 8 is shown as coaxial to electrode 1, having a smaller inside diameter than electrode 1, and spaced from electrode 1 along the common longitudinal axis. A voltage potential between electrodes 1 and 8 is provided by a suitable power source not shown. When alternating current is used, insulation 9 is provided at each end of the electrode 8 and insulation 4 is provided for electrode 1. When direct current is supplied to the electrodes, insulation is removed from one electrode and that electrode grounded, e.g., insulation 9 can be removed from electrode 8 and this electrode grounded.

Arc gas, such as oxygen or an oxygen-containing gas, e.g., air, is introduced through at least one inlet 6 to chamber 5 which encompasses, in part, the space between the lower portion of electrode 1, and the upper portion of electrode 8. Although only one gas inlet 6 is shown, it is possible to provide several gas inlets (e.g., 2–6 or more) about the periphery of chamber 5 for the introduction of the arc gas. These gas inlets can be positioned on the same horizontal plane or can be placed on several planes transverse to the longitudinal axis formed by the coaxial electrodes. Typically, the gas inlet will be a jet inlet so as to introduce the arc gas, such as oxygen, at a high velocity, e.g., at the speed of sound measured in the arc gas at the temperature and pressure of the gas. It is also desirable to position the gas inlets so that the arc gas is introduced tangentially to the inner wall of chamber 5 to provide rotational (swirling) flow to the arc gas. Chamber 5 is typically a cylindrical casement to aid in promoting rotational flow, i.e., vortex or helical flow.

By introducing the arc gas tangentially to chamber 5, and preferably through a twisting guide, a whirling motion is imparted to the gas. As the gas whirls about within chamber 5, it takes an ever-decreasing circular path as it approaches the center of the chamber. When the circular path taken by the gas reaches a path defined by the internal diameter of hollow electrode 1, a substantial portion of the gas takes the path of least resistance and flows into electrode 1. Thus, the arc gas follows a swirling, helical path into, and along, the inside circumference of electrode 1. When the arc gas reaches the blocked end 2A of electrode 1, it again follows the path of least resistance by orienting itself into a smaller, circular path. This path leads back through the center of electrode 1 in the opposite direction and is substantially defined by the internal diameter of electrode 8. Preferably, the blocked end of electrode 1 takes a conical shape, as shown, which aids in reversing the direction of the swirling gas toward and through electrode 8. After passing through electrode 8, the gas passes through passage 10 into reaction chamber 17.

As the arc gas flows between electrodes 1 and 8, arc A, which traverses both electrodes, passes through it. Energy from the arc is thereby transferred to the gas and is exhibited by the gas as heat energy.

After the arc gas is heated by electric arc A, the gas passes downwardly into passage 10, where it can be, if desired, mixed and cooled with a cooler secondary gas stream, introduced through nozzle means 12. If, as shown in FIGURE 3, the arc gas is oxygen, a cooler stream of oxygen can be introduced through nozzle 12 to regulate the temperature of the oxygen entering reactor chamber 17.

Still referring to FIGURE 3, and with specific reference to the production of titanium dioxide, there is shown tubes 13 and 15 which are coaxial with, and concentric to passage 10. Passage 10 is insulated from tubes 13 and 15 by means of ceramic refractory 11 supported and retained by wall 11A.

Heated arc gas, e.g., oxygen, passes through passage 10 and into chamber 17, within which is contained the vapor phase oxidation reaction zone. The oxygen stream can be surrounded externally by a concentric inert gaseous stream or shroud, e.g., chlorine, emitted from annulus 18 of concentric tube 13 and the inert gaseous stream can, in turn, be externally surrounded by a concentric stream of vaporous metal halide, e.g., titanium tetrahalide ($TiCl_4$), emitted from annulus 19 of concentric tube 15. Nozzle 16 is provided for introducing vaporous metal halide into the upper portion of annulus 19 of concentric tube 15 and nozzle 14 is provided for introducing the shroud gas into the upper portion of annulus 18 of the tube 13.

As further illustrated in FIGURE 3, the heating zone, i.e., the zone wherein the arc gas is heated to elevated temperatures, is preferably positioned in direct communication, i.e., positioned radially and visually in line of sight, with reaction chamber 17. That is, the two zones (heating zone and reaction zone) are positioned in a straight line and preferably are less than 0.2 second, more preferably less than 0.05 second, apart based upon the speed of the heated arc gas stream emitted from the heating zone. The two zones are further preferably positioned so that the heated oxygenating gas stream can pass without impedance from the heating zone to the reaction zone. By so positioning the two zones, heat energy emanating from the arc and heated arc gas can be communicated into the reaction zone without substantial heat loss.

The practice of the present invention has hereinbefore been described and illustrated in conjunction with the apparatus depicted in FIGURE 3. However, it is to be understood that the apparatus illustrated in FIGURE 3 is merely one way of practicing the present invention and that other electrode configurations, as well as other burner designs, can be employed.

Figure 4:
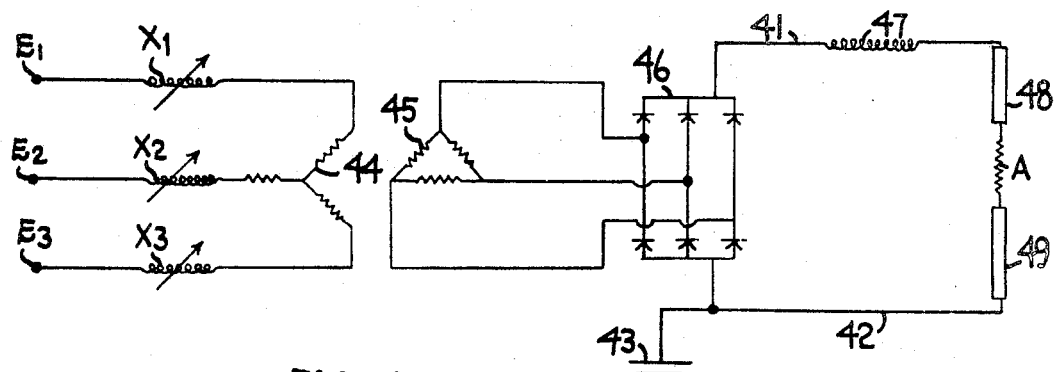
FIGURE 4 is a schematic of an electrical circuit for operation of an electric arc.

Referring now to FIGURE 4, there is shown a schematic of an electric circuit which can be used to power an electric arc such as described in connection with FIGURE 3. More particularly, there is shown alternating current power source $E_1$, $E_2$, $E_3$, saturable reactors $X_1$, $X_2$, $X_3$, and a transformer consisting of primary winding 44 and secondary winding 45. Leads from the secondary winding 45 are connected to a bank of rectifiers 46. In lead 41 from rectifiers 46 to the electrode 48, there is positioned an air-core inductance coil 47. Lead 42 connects rectifiers 46 to electrode 49 and also to ground 43.

Figure 5:
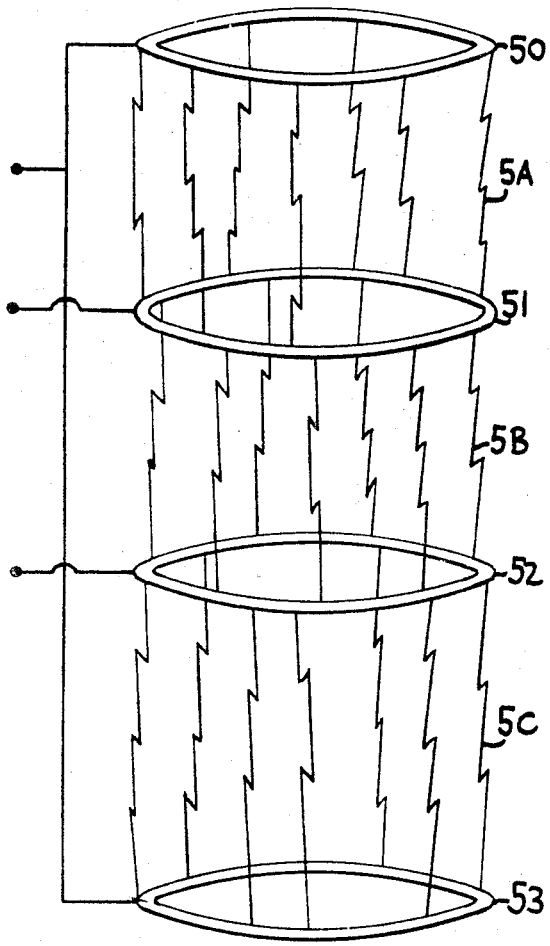
FIGURE 5 is a schematic of a particular electric circuit for the operation of an electric arc wherein four or more electrodes are employed.

In FIGURE 5, there is shown a series of four coaxial electrode rings 50, 51, 52, and 53 connected to a three-phase A.C. power circuit. Broken lines 5A, 5B, and 5C represent the electric arc discharge respectively from ring electrode 50 to 51, 51 to 52, and 52 to 53.

Figure 6:
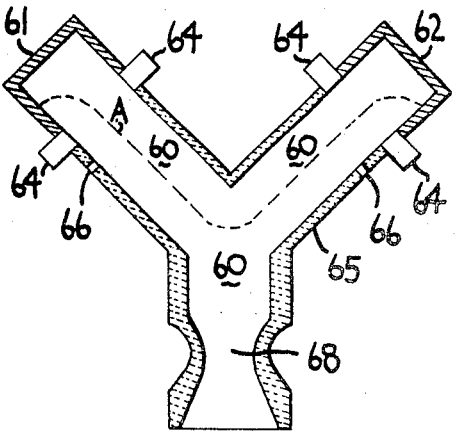
FIGURE 6 is a simplified cross-sectional view of plasma generating apparatus in radial configuration.

Referring to FIGURE 6, there is shown electrodes 61 and 62, insulation 64 separating said electrodes from assembly 65, which can be fabricated from ceramic refractory, gas inlet ports 66 and nozzle 68. Either electrode can be the anode or cathode. Electrodes 61 and 62 are connected to a suitable power source, not shown, and an arc discharge A heats the arc gas or gases introduced through ports 66 within heating zone 60. The arc plasma is formed within heating zone 60 and particularly at the fork of the Y configuration and emitted through nozzle 68.

The present invention will be described more particularly with reference to the apparatus illustrated in FIGURE 3, for the production of finely-divided pigmentary titanium dioxide. Although described specifically with respect to the apparatus shown and to the production of titanium dioxide, such description is not intended to restrict the invention thereby in any way.

Voltage and current requirements for electrodes 1 and 8 can vary over a wide range and generally increase with an increase in the rate of arc gas flow. The exact voltage and current levels per volume of gas flow is a function of the over-all configuration and design of the plasma generation equipment, i.e., they will vary with the particular mechanical and electrical design of commercial fabricators of arc heaters. In the configuration disclosed in FIGURE 3, voltage requirements can range between about 250 and about 2,500 volts or more, e.g., 3,000–4,500 volts; current requirements can range between about 20 and about 200 amperes or more, e.g., 250–400 amperes, but advantageously range between about 80 and 110 amperes. Both voltage and current requirements will vary as the power demands change in accordance with the required enthalpy of the arc gas, e.g., oxygen. Thus, the amount of heat imparted to the arc gas is dependent upon the amount of heat required in the reaction zone to maintain the particular vapor phase oxidation. This latter quantity can be calculated from an over-all heat balance around the reactor. Generally, a power source furnishing high voltage and low current is preferred; however, the reverse, i.e., arc apparatus described herein; however, the reverse, i.e., low voltage-high amperage, or variations therebetween can be used.

Power requirements for coil 3 are sufficient to rotate the arc. Here also, the exact requirements depend on the design of the arc heater and coil. In the configuration of FIGURE 3, power requirements can vary between 20 and 100 volts at 400 to 800 amperes.

The arc can be initiated by a striker mechanism, usually constructed out of carbon or copper, which is inserted temporarily between the electrodes and withdrawn. Typically, a solid carbon rod is inserted between the electrodes and positioned to cause a temporary flow of electrons from the cathode, e.g., electrode 1, to the bottom portion of chamber 5. The carbon rod is then withdrawn leaving an arc across electrode 1 in swirl chamber 5. This arc is rapidly shifted by the incoming tangential flowing gas, such that it moves out toward the axis of the electrode assembly passing in a helical pattern from electrode 1 to electrode 8. Alternatively, a noble gas such as helium or neon can be introduced into the space between the electrodes, to aid in striking the arc. Once again, the arc is initiated across one segment of the chamber 5 and then moves rapidly to a stable position coaxial with the electrode assembly. Once the arc is established, the flow of inert gas is terminated. Other initiating means include a high frequency starter, capacitor discharge, and the use of a moderate vacuum whereby the residual gas is ionized directly by the applied voltage.

Arc A is generally unstable due to the random movement of ions in the arc gas caused by the turbulent arc gas stream. The helical motion of the arc gas, however, serves to stabilize and direct the arc, for the reason that the arc tends to follow the same path, i.e., helical, as the ions generated in the arc gas. The length of the arc is, in part, a function of the relative speed of the arc gas as it travels through the electrode assembly. Better arc behavior and stability are obtained with a swirling high velocity stream having a velocity of at least one-tenth the speed of sound, preferably greater than one-half the speed of sound at the particular gas temperature.

Any suitable gas can be employed as the arc gas. Typically, and in accordance with the present process, vaporous metal halide, e.g., titanium tetrachloride, oxygen-containing gas, e.g., oxygen, or an inert gas can be used. The term, "inert gas," as employed in connection with the arc gas, is intended to mean and include any gas which is substantially inert to the oxidation of the metal halide at reaction conditions. Examples of suitable inert gases include: noble gases, such as argon, helium, krypton and xenon, nitrogen, chloride, carbon dioxide, or mixtures thereof. Preferably, oxygen is used as the arc gas.

When metal halide is employed as the arc gas, the oxygen-containing gas can be introduced through nozzle means 16 and annulus 19 of tube 15 (FIGURE 3). When an inert gas is used as the arc gas, the oxygen-containing gas can be introduced through nozzle means 12 or preferably by an annulus concentric to the heated inert gas and the vaporous metal halide. In the latter case, the oxygen-containing gas is advantageously placed between the heated inert gas and shroud gas introduced through nozzle 14, i.e., internally concentric to the metal halide stream introduced through annulus 19.

The oxygenating gas stream employed in the present process can be substantially pure oxygen or a gaseous stream containing free or elemental oxygen, e.g., air, oxygen-enriched air, or oxygen mixed with the products of a combustible gas, such as carbon monoxide. Typically, the amount of oxygen supplied to the system will be in a stoichiometric amount so as to convert all of the metal halide introduced, e.g., titanium tetrachloride, to metal oxide, e.g., titanium dioxide. Although greater or slightly less than stoichiometric quantities of oxygen can be employed, the amount of oxygen used will be generally from 0.9 to 2.5 times that of stoichiometric quantities. It is economically desirable that the amount of oxygen employed be not greater than 10 percent above the stoichiometric amount. It is likewise desirable that complete reaction of the metal halide be accomplished because of the difficulty of handling product metal oxide containing unreacted metal halide. Usually, the amount of oxygen introduced to the reaction zone ranges from 1.01 to 1.5 moles of oxygen for each mole of metal halide fed to the reaction zone. More than stoichiometric quantities are provided to insure complete oxidation of the metal halide and other oxidizable compounds, e.g., metal halide additives, which are added to the reaction zone.

The arc gas is introduced at jet inlet 6 at relatively high speeds so as to provide sufficient helical motion to aid in stabilization of the arc and sufficient differential pressure at the annuli, e.g., 18 and 19, adjacent to the heated arc gas so as to provide aspiration and proper mixing of reactants and shroud gases introduced through said annuli. Generally, velocities of a sub-sonic, sonic, and super-sonic nature can be used. Typically, velocities between 0.1 Mach and the speed of sound (Mach 1) are used. The term, "Mach," refers to the ratio of the linear gas velocity to the velocity of sound in the same gas for the given temperature and gas composition. When oxygen is used as the arc gas, linear inlet velocities at ambient temperature of from 150 to 400 ft./sec. are typical. Linear velocities of the heated oxygen, i.e., after passage through the arc assembly can vary between 400 and about 1,300 ft./sec. Arc gas linear inlet velocities can be initiated by passing the arc gas under pressure through suitable jet inlets. Line pressures at the inlet can vary between 25 p.s.i.a. and about 400 p.s.i.a.

Initial temperatures to which the arc gas stream is heated as it passes through the arc will be a function of the over-all heat requirements of the system. Thus, where titanium tetrachloride is being reacted in the vapor phase to produce pigmentary titanium dioxide, sufficient enthalpy should be imparted to the arc gas in order to establish and maintain the reaction by providing in the reaction zone a temperature above 700° C., e.g., 700° C. to 1,600° C., preferably in the range of 900° C. to 1,200° C. Typically, the arc gas passing through the arc assembly is heated to an initial temperature of between about 1,600° C. and about 30,000° C., and usually is heated to a temperature of between about 1,900° C. and about 2,500° C.

Secondary arc gas, e.g., oxygen, introduced through nozzle means 12 can also be employed to regulate the ultimate temperature of the heated arc gas delivered to the reaction zone. Depending upon the ultimate temperature desired, and the temperature of the heated arc gas stream exiting from the arc assembly, calculatable quantities of cooler arc gas can be admixed with the heated stream so that the resulting mixture will have an average temperature in the range desired. The quantity of secondary arc gas added at inlet means 12 can range from 0 to 35 times that of the primary arc gas on a gram-mole basis in order to reach the desired temperature. Thus, a freedom of choice between a small amount of arc gas at high enthalpy and a larger amount at lower enthalpy is provided by the ability to vary the secondary gas flow to give a mixture of the desired properties.

In the production of metal oxides by vapor phase oxidation of the corresponding metal halide, reaction temperatures are generally above 500° C., usually between 700° C. and 1600° C. Reaction pressures range from about 10 to about 150 pounds per square inch aboslute.

The shroud gas introduced through inlet 14 and annulus 18 is typically inert with respect to the reactants at reaction temperatures. Examples of such gases include: chlorine, nitrogen, carbon dioxide, recycled tail gases from the reaction (without metal oxide product), helium, and argon. Typically, the amount of shroud gas fed to the reactor is in the order of from 0.01 to 200 mole percent, based on the amount of metal halide, e.g., titanium tetrahalide, introduced into the reaction zone. Preferably, inert gases are employed in amounts of between about 5 and 100 mole percent. The inert shroud gas usually will not have a velocity exceeding the heated arc gas stream; but can have a velocity equivalent to it. However, better results are obtained when its velocity is less than 50 percent, e.g., 5 to 40 percent, of the velocity of the arc gas.

When the arc gas is oxygen, the inert shroud gas shields the oxygen stream from the metal halide, e.g., titanium tetrachloride, stream introduced through inlet 19, so that the two streams do not react adjacent to the inlets. Premaure reaction close to the surface of the inlets cause metal oxide encrustation and eventual blockage of the inlets.

The velocity of the arc gas, e.g., oxygen, metal halide, and inert shroud gas streams are regulated so as to effect intimate mixing thereof within a period of between about 0.5 to 10 milliseconds, preferably between about 1 and about 1.5 milliseconds. The metal halide will not usually have a velocity exceeding the arc gas or shroud gas but can have a velocity equivalent thereto. Preferably, the velocity of the metal halide will be less than the reactant streams inwardly concentric thereto. Typically, velocities of the vaporous metal halide stream range from about 25 to about 200 ft./sec.

In the production of pigmentary metal oxide, such as titanium oxide, it has been found beneficial to introduce certain additives to the reaction zone to improve the properties of the pigmentary titanium dioxide produced. For example, if an aluminum compound, notably an aluminum salt, such as aluminum chloride, is added to the reaction zone by means of the titanium tetrahalide stream or the intervening inert gas stream, the titanium dioxide product so produced is found to have an increased rutile content, typically in excess of 98 percent, and in most cases, above 99 percent. The same result occurs when a zirconium salt, particularly zirconium tetrachloride, is similarly added to the reaction zone. The amount of rutile promoting salts added to the reaction can vary within a wide range, although, in general, they will be employed in an amount of between about 0.5 and about 10 mole percent, based on the moles of titanium tetrahalide reactant.

A silicon halide, such as silicon tetrachloride, can also be incorporated into the reaction zone by admixture with, for example, the titanium tetrahalide stream, or the inert gas stream. Silicon halides have been found to repress the agglomeration and effective particle size of the pigment produced in the oxidation reaction. In general, the silicon halide additives are employed in amounts of from about 0.001 to about 2.7 mole percent, preferably between about 0.01 and about 2 mole percent, based on the moles of titanium tetrahalide added to the reaction zone. Higher quantities than those indicated of silicon additive tend to favor the production of anatase pigment and counteract the effect of rutile promoting compounds, such as aluminum or zirconium compounds.

Alkali metal and/or alkaline earth metal compounds, including soluble or insoluble organic and inorganic compounds, can also be introduced into the reaction zone. Potassium compounds have been found to give particularly beneficial results with regard to the type of pigment produced. Typical usable salts include potassium chloride, potassium sulfate, potassium nitrate, potassium acetate, phenyl potassium, or mixtures thereof. The potassium compounds have been found to improve the dispersion of the titanium dioxide pigment and to repress the particle size of the titanium dioxide produced during reaction. Elemental alkali or alkaline earth metals can also be used.

Examples, not by way of limitation, of pigmentary metal oxides which can be produced from their corresponding halides, i.e., chlorides, fluorides, bromides, and iodides, by the aforementioned process include the oxides of aluminum, arsenic, boron, iron, phosphorus, silicon, strontium, tin, titanium, zinc, zirconium, niobium, antimony, lead, and mercury. When titanium dioxide is the metal oxide, titanium tetrachloride, titanium tetrabromide, and titanium tetraiodide are advantageously used. The tetrachloride is economically preferred.

The present process is more particularly described in the following examples which are intended as illustrative only, since numerous modifications and variations thereof will be apparent to those skilled in the art.

EXAMPLE I

Employing the apparatus illustrated in FIGURE 3, a direct current arc was struck between electrodes 1 and 8. The arc was powered by direct current of between 90 and 100 amperes at about 1,000 volts. Field coil 3 carried 400 amperes of direct current.

Each electrode was an extruded, elongated cylinder composed of an alloy comprising about 80 percent by weight silver and about 20 percent by weight copper. Electrode 1 was employed as the cathode and electrode 8 was employed as the anode. Since direct current was used, electrode 8 was grounded.

The anode, that is front electrode 8, had a length of about 8½ inches, an inside diameter of 0.750 inch, and an initial weight of 1152.7 grams. The cathode, i.e., back electrode 1, had a length of about 9 inches, an inside diameter of 1.25 inches, and an initial weight of 1595.7 grams.

Oxygen at about 20° C. was tangentially introduced into chamber 5 through jet inlet 6 at a rate of 24 gram-moles per minute and a linear velocity equal to about the speed of sound. The pressure differential through the oxygen jets was 110 pounds per square inch and the pressure differential through the arc heater assembly was 15 pounds per square inch. Substantially all of the oxygen, thus introduced, passed through the inside of both electrodes in the manner described hereinbefore, was heated by the arc (A) and exited through the bottom portion of the anode 8. The temperature of the oxygen stream immediately after its passage through the arc was about 2,650° C., which was equivalent to an enthalpy of about 1,720 B.t.u. (British thermal units) per pound of oxygen.

The heated oxygen stream was then mixed with a secondary supply of oxygen introduced through nozzle inlet 12 at about 20° C. and 17 pounds per square inch absolute pressure such that the resulting temperature of the two oxygen streams after mixing was about 2,150° C., which is equivalent to an enthalpy of about 1,150 B.t.u. (British thermal units) per pound of oxygen.

The resulting oxygen mixture was fed as a continuous stream into reactor chamber 17. Simultaneously, there was introduced 32 gram-moles per minute of titanium tetrachloride at 420° C., through tube 15, and 5 gram-moles per minute of chlorine at 150° C. through tube 13 to provide a chlorine shroud between the oxygen and the titanium tetrachloride streams. The total oxygen thus added was in excess of about 16 mole percent based on the amount of oxygen theoretically required to convert titanium tetrachloride to titanium dioxide. Liquid silicon tetrachloride in an amount of 0.18 gram-mole per minute and 100 to 125 grams per minute of aluminum chloride at 300° C. were added to the titanium tetrachloride stream before its introduction into the reactor to promote the formation of pigmentary titanium dioxide.

The oxygen and titanium tetrachloride streams are mixed and reacted at a point within the reaction zone 17 downstream from the concentric tubes due to the protecting chlorine shroud. A thermocouple located in the upper portion of the reaction zone measured the therein prevailing temperature as 1,160° C. The absolute pressure in the reactor was about 16 pounds per square inch.

An effluent comprising a gaseous suspension of pigmentary titanium dioxide product was withdrawn from the bottom of the reactor. The apparatus was thus operated for a period of about 73 hours. The rear electrode lost 6.4 grams or an average of .088 gram per hour. The front electrode, i.e., electrode 8, lost a total of 9.9 grams for an average weight loss of .135 gram per hour. The titanium dioxide product is analyzed for contamination from silver or copper oxides at various times during the experimental run and less than 5 p.p.m. contamination is found.

The electrodes were used subsequently for additional similar runs. The rear electrode was used a total of 1,131 hours and the front electrode a total of 1,571 hours. Examination of both electrodes following the periods of use indicated, showed that each could be used for additional runs.

EXAMPLE II

Utilizing the apparatus of FIGURE 3, and procedure of Example I, but replacing the silver-copper alloy electrodes of Example I with all copper electrodes, titanium dioxide is produced for a period of about 32 hours. The titanium dioxide product produced is found to contain greater than 5 parts per million of copper due to erosion of the electrodes. More severe corrosion is found to have taken place on the back electrode 1 than on the front electrode 8. Copper contamination in such amounts yields a product that is lower in color than that produced in Example I. Such a product is not as acceptable a pigment for paint vehicles as that produced in Example I.

The experimental run using copper electrodes is continued, but the copper cathode perforates after approximately an additional 48 hours. As a result, the run is terminated. Thus, the copper cathode is used only for a total of about 80 hours before failure.

EXAMPLE III

Utilizing the apparatus of FIGURE 3, and the procedure of Example I, but replacing the 80–20 silver-copper alloy anode with an electrode comprising about 90 weight percent silver and about 10 weight percent copper, titanium dioxide was produced for a total of 531 hours without electrode failure. The titanium dioxide product is analyzed for contamination and less than 5 p.p.m. silver or copper is found.

EXAMPLE IV

In accordance with the procedure of Example I, titanium dioxide is produced in apparatus similar to FIGURE 3, utilizing electrodes comprising about 72 weight percent silver and about 28 weight percent copper. Contamination of less than 5 p.p.m. from silver and copper is found in the product.

EXAMPLE V

Employing the apparatus illustrated in FIGURE 3, titanium dioxide was prepared by vapor phase oxidation of titanium tetrachloride with oxygen.

Electrodes 1 and 8 were constructed out of a silver-copper alloy of about 80 percent silver and about 20 percent copper. The arc between electrodes 1 and 8 was initiated by introducing helium gas into the space between the electrodes until the arc was functioning.

Power to the field coil 3 in an amount of 25 volts and 300 amperes was applied to establish a magnetic field about electrode 1, so as to provide for movement of the arc termination point around the inside circumference of electrode 1. Power requirements for the arc after initiation were about 1,200 volts and about 100 amperes.

Oxygen at room temperature, about 20° C., and at about 45 gram-moles per minute was tangentially introduced into chamber 5 through jet inlets circumferentially located about chamber 5. The oxygen line pressure at point of entry, i.e., jet inlet 6, was about 70–80 pounds per square inch gage. Its speed at entry was about the speed of sound. The speed of the heated oxygen emitted from the bottom of electrode 8 was about 0.4 Mach. Its temperature at the same point was calculated to be about 4,500° F.

Chlorine shroud gas at a temperature of about 180° F. and in an amount of about 9 gram-moles per minute was introduced through nozzle 14 and annular space 18. Simultaneously, vaporous titanium tetrachloride at about 830° F. and in an amount of about 36 gram-moles per minute was introduced through nozzle 16 and annular space 19. Aluminum chloride in an amount sufficient to provide about 2 weight percent $Al_2O_3$ based on the titanium dioxide and silicon tetrachloride in an amount sufficient to provide about 0.6 weight percent $SiO_2$ based on the titanium dioxide produced was added to the titanium tetrachloride stream before its introduction to nozzle 16. Potassium as potassium chloride was added to the reactor in an amount of about 8 p.p.m.

The oxygen and titanium tetrachloride streams admixed and reacted at a point within reactor 17, but removed from burner tubes 11A, 13 and 15. The average reaction zone temperature at the upper portion of the reaction zone was about 1,700° F. Pressure within the reactor was maintained at about 4.0 pounds per square inch gage.

Finely-divided pigmentary titanium dioxide was withdrawn from the reactor. Typical analysis of a product sample during the run described was as follows:

Tinting strength: 1810 (Reynolds Scale).
Tint tone: Neutral.
Rutile content: 98.6 percent.
Particle size: 0.28 micron (weight median).
Silicon dioxide in product ($SiO_2$): 0.6 weight percent.
Aluminum oxide in product ($Al_2O_3$): 2 weight percent.

The tinting strength and tone of the pigmentary $TiO_2$ can be determined in accordance with A.S.T.M. D–332–26, "1949 Book of A.S.T.M. Standards," part 4, page 31, published by the American Society for Testing Material, Philadelphia 3, Pennsylvania.

The data of Examples I–V show that pigmentary titanium dioxide can be effectively produced by utilizing electrical energy as a source of heat for the vapor phase oxidation of titanium tetrachloride. The data also show that the use of silver-copper alloy electrodes in such process provides continuity to the process and produces titanium dioxide free of objectionable contamination from eroded electrode material.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

We claim:
1. In a process of preparing finely-divided metal oxide by vapor phase oxidation of metal halide with oxygen-containing gas in a reaction zone at elevated temperatures wherein heat is furnished to the reaction zone to sustain said oxidation reaction, the improvement which comprises heating gas with a discharge of electrical energy conducted between silver-copper alloy electrodes comprising at least 72 weight percent silver and at least 1 weight percent copper, forwarding thus heated gas of sufficient enthalpy to the reaction zone to sustain said oxidation reaction, and removing finely-divided metal oxide from the reaction zone.

2. A process according to claim 1 wherein said metal oxide is titanium dioxide and said metal halide is a titanium tetrahalide selected from the group consisting of titanium tetrachloride, titanium tetrabromide and titanium tetraiodide.

3. A process according to claim 1 wherein said reaction zone temperature is above 500° C.

4. A process according to claim 1 wherein said heated gas has a temperature of at least 1,600° C.

5. A process according to claim 2 wherein the gas heated with the electrical discharge is selected from the group consisting of titanium tetrahalide, inert gas and oxygen-containing gas.

6. A process of preparing finely-divided metal oxide by vapor phase oxidation of metal halide with oxygen in a reaction zone at elevated temperatures, which comprises heating oxygen with a discharge of electrical energy conducted between silver-copper alloy electrodes comprising at least 72 weight percent silver and at least 1 weight percent copper, forwarding thus heated oxygen to the reaction zone, admixing metal halide therewith and removing finely-divided metal oxide from the reaction zone.

7. A process according to claim 6 wherein said metal oxide is titanium dioxide and said metal halide is selected from the group consisting of titanium tetrachloride, titanium tetrabromide and titanium tetraiodide.

8. A process according to claim 7 wherein said reaction zone temperature is from 900° C. to 1,500° C.

9. A process according to claim 6 wherein said oxygen is heated to temperatures of from 1,600° C. to 30,000° C.

10. A process according to claim 6 wherein said silver-copper alloy electrode comprises about 80 weight percent silver and about 20 weight percent copper.

11. A process of preparing pigmentary titanium dioxide by vapor phase oxidation of titanium tetrahalide with oxygen in a reaction zone at temperatures above 500° C., which comprises heating oxygen to temperatures of at least 1,900° C. with an electric arc conducted between silver-copper alloy electrodes comprising at least about 72 weight percent silver and at least 1 weight percent copper, forwarding thus heated oxygen to said reaction zone, admixing titanium tetrahalide therewith and removing titanium dioxide from the reaction zone.

12. A process according to claim 11 wherein said titanium tetrahalide is selected from the group consisting of titanium tetrachloride, titanium tetrabromide and titanium tetraiodide.

13. A process according to claim 11 wherein said oxygen is heated to temperatures of from 1,900° C. to 2,500° C.

14. A process according to claim 11 wherein said silver-copper alloy electrode comprises about 80 weight percent silver and about 20 weight percent copper.

15. A process of preparing pigmentary titanium dioxide by vapor phase oxidation of titanium tetrachloride with oxygen in a reaction zone at temperatures of from 700° C. to 1,600° C. which comprises passing oxygen-containing gas through an electric arc sufficiently intense to heat said gas to temperatures of from 1,600° C. to 30,000° C., said electric arc being conducted between silver-copper alloy electrodes containing at least 72 weight percent silver and at least 1 weight percent copper, forwarding said heated oxygen-containing gas to said reaction zone, admixing titanium tetrachloride therewith and removing titanium dioxide from said reaction zone.

16. A process according to claim 15 wherein said oxygen-containing gas is oxygen.

17. In a process for preparing finely-divided metal oxide by vapor phase oxidation of metal halide with oxygen-containing gas in a reaction zone wherein gas heated by a discharge of electrical energy conducted between electrodes is introduced into the reaction zone, the improvement which comprises using a silver-copper alloy electrode comprising at least 72 weight percent silver and at least 1 weight percent copper to conduct said electrical discharge.

18. A process according to claim 17 wherein said metal oxide is titanium dioxide and said metal halide is a titanium tetrahalide selected from the group consisting of titanium tetrachloride, titanium tetrabromide and titanium tetraiodide.

19. A process according to claim 17 wherein the gas heated by electrical discharge is selected from the group consisting of metal halide, oxygen-containing gas and inert gas.

20. A process according to claim 17 wherein said silver-copper alloy electrode is selected from the group of compositions consisting of (a) about 72 weight percent silver and about 28 weight percent copper, and (b) about 80 weight percent silver and about 20 weight percent copper.

References Cited
UNITED STATES PATENTS

| | | | |
|---|---|---|---|
| 2,768,061 | 10/1956 | Cook et al. | 23—153 |
| 2,921,892 | 1/1960 | Casey | 204—164 |
| 3,114,691 | 12/1963 | Case | 204—171 |
| 3,275,411 | 9/1966 | Freeman et al. | 23—202 |

EDWARD STERN, Primary Examiner

U.S. Cl. X.R.

23—165, 182, 183, 186; 106—300; 204—164